United States Patent [19]

Fondacci et al.

[11] Patent Number: 4,608,822
[45] Date of Patent: Sep. 2, 1986

[54] SYSTEM FOR CONTROLLING THE VALVES OF A TURBO JET SHAFT ENGINE NOZZLE

[75] Inventors: Jean-Luc Fondacci, Montgeron; Yves-Marie M. R. François, Dammarie Les Lys, both of France

[73] Assignee: Societe Nationale d'Etude et de Construction de Moteurs d'Aviation S.N.E.C.M.A., Paris, France

[21] Appl. No.: 709,364

[22] Filed: Mar. 11, 1985

Related U.S. Application Data

[63] Continuation of Ser. No. 557,393, Dec. 2, 1983, abandoned, which is a continuation of Ser. No. 307,444, Oct. 1, 1981, abandoned.

[30] Foreign Application Priority Data

Oct. 1, 1980 [FR] France .................. 80 21004

[51] Int. Cl.$^4$ .................. F02K 1/12; F02K 1/15
[52] U.S. Cl. .................. 60/242; 60/39.183
[58] Field of Search .................. 60/39.07, 39.183, 242; 415/20, 27, 36, 40, 147, 148, 150, 157; 239/265.19, 265.33

[56] References Cited

U.S. PATENT DOCUMENTS

| | | | |
|---|---|---|---|
| 2,523,842 | 9/1950 | Oulianoff | 239/265.19 |
| 2,551,229 | 5/1951 | Alford et al. | 60/39.3 |
| 2,612,020 | 9/1952 | Griffith . | |
| 2,613,029 | 10/1952 | Wilde | 415/147 |
| 3,002,500 | 10/1961 | Diesing . | |
| 3,060,680 | 10/1962 | Wilde et al. | 60/242 X |
| 3,063,460 | 11/1962 | Krauss | 415/20 |
| 3,109,285 | 11/1963 | Smith | 60/39.18 R X |
| 3,330,289 | 7/1967 | Grace | 415/150 |
| 3,401,520 | 9/1968 | Dineen . | |
| 3,537,647 | 11/1970 | Camboulives et al. | 239/265.33 |
| 3,570,101 | 3/1971 | Stead . | |
| 3,640,068 | 2/1972 | Mann . | |
| 3,932,058 | 1/1976 | Harner et al. | 415/148 X |

FOREIGN PATENT DOCUMENTS

| | | |
|---|---|---|
| 1205480 | 2/1960 | France . |
| 1215236 | 4/1960 | France . |
| 1215237 | 4/1960 | France . |
| 2404113 | 4/1979 | France . |
| 1136584 | 12/1968 | United Kingdom . |

Primary Examiner—Louis J. Casaregola
Attorney, Agent, or Firm—Oblon, Fisher, Spivak, McClelland & Maier

[57] ABSTRACT

The invention concerns a system for controlling the flaps of a turbine engine nozzle. High-pressure air P4 is bled from the compressor of the turbine engine to feed a compressed-air engine. The shaft of the engine rotates a constant-capacity displacement pump which sends hydraulic liquid into a jack controlling the flap or flaps of the nozzle. The invention is applicable to the control of all movable flaps of turbine engine nozzles.

3 Claims, 1 Drawing Figure

SYSTEM FOR CONTROLLING THE VALVES OF A TURBO JET SHAFT ENGINE NOZZLE This application is a continuation of application Ser. No. 557,393, filed Dec. 2, 1983, now abandoned, which is a continuation of prior application Ser. No. 307,444 filed on Oct. 1, 1981, now abandoned.

BACKGROUND OF THE INVENTION

1. Field of the Invention

The present invention concerns a system for controlling the flaps of a turbine engine nozzle.

2. Description of the Prior Art

Turbine engine nozzles whose section can be adjusted according to the engine speed by means of displacement of flaps in the form of movable wall elements, have been known for a long time. Applicant's French Pat. Nos. 1,215,236 and 1,215,237, for example, disclose nozzles equipped with pivoting flaps making it possible to regulate the nozzle section as well as to modify the nozzle contour from a converging shape suitable for subsonic flows to a convergent-divergent shape suitable for supersonic flows, and vice-versa.

Thrust reversers for turbine engine nozzles, which also include movable flaps, are also known.

Many types of systems are known which make it possible to control the flaps of a turbine engine nozzle. Some of these known systems include hydraulic jacks for controlling the movable flaps; they are fed with fuel or with a standard hydraulic liquid by a pump selected so as to meet the system's operating conditions. According to their operation, the hot gases leaving the nozzle apply pressure on each flap, which tends to make it pivot radially outward, further separating the flap from the axis of the nozzle. This pressure exerted on each flap is relatively low when it is in its position corresponding to the maximum opening of the nozzle, and is much stronger when each flap is in its position corresponding to the minimum opening of the nozzle (or in its complete closure position in the case of thrust-reverser flaps). The pump's delivery pressure must therefore be much higher in the second case than in the first. Furthermore, the pump must be able to supply a considerable flow during the short periods of transitory speed of the turbine, during which the flaps of the nozzle must be brought from a position corresponding to the maximum opening of the nozzle to a position corresponding to the minimum opening of the nozzle. In contrast, during steady operation of the turbine engine, the pump need supply only a weak flow corresponding primarily to the fluid loss from the hydraulic jacks.

In order to attempt to satisfy these various operating conditions, pumps of various types have already been utilized, each driven mechanically by the shaft of the turbine engine either directly or through an appropriate transmission. Thus, self-regulating constant-capacity, positive displacement pumps have already been utilized in association with modulator valves intended to recycle the excess fraction of the flow from the pump.

All these systems have in common the drawback that the speed of the pump and the flow remain high, even at steady speed, causing wear and overheating. In addition, the modulator vlaves give the system a response time that is too long at transitory speeds.

The use of a constant-capacity, positive displacement pump has also been tried in association with a jet valve; the stability of such a system is not yet certain, however. Associating two displacement pumps has also been thought of, with one constantly sending a weak flow of hydraulic liquid or fuel into the jack to compensate for fluid loss in steady operation, while the flow delivered by the other displacement pump is recycled, except during transitory speeds when it is likewise sent into the jack. Such a system is obviously heavy and costly. Variable-output pumps which are also able to reverse the direction of the flow have also been utilized. Such systems are however relatively complex and various accessories, such as pressure regulators, must be associated with them. Finally, the idea arose of associating a relatively low-output (but sufficient for steady operation) displacement pump with a hydraulic accumulator which was only put into use during transitory speeds. However, this solution assumed that the intervals between successive transitory speeds, i.e., between successive maneuvers of the movable flap, were sufficient to allow recharging of the accumulator.

SUMMARY OF THE INVENTION

The present invention has as a primary object the producing of a system for controlling the flaps of a turbine engine nozzle by means of hydraulic jacks fed by a constant-capacity displacement pump in which the previously indicated drawbacks of the systems of this type which have been developed up to now are avoided.

The system according to the present invention is provided with a constant-capacity pump driven at a variable speed by a compressed-air motor, itself fed with the variable high-pressure air bled from the compressor of said turbine engine.

The system according to the present invention offers the advantage of excellent adaptation of the hydraulic jack's performance to the operating conditions of the turbine engine. The delivery pressure from the constant-capacity pump is virtually proportional to the relative pressure of the air bled from the compressor of the turbine engine, for example at the outlet of its last stage. This is particularly advantageous since the maximum available stress that each jack applies to the movable flap is thus constantly proportional to the pressure at the outlet of the turbine engine's compressor, while the resistance opposing the movement of each flap is due essentially to the pressure of the gases ejected through the nozzle, which itself is a varying function of the pressure at the outlet of the compressor. Thus is obtained an automatic adaptation of the pressure, i.e., of the forces available for controlling said flaps. Furthermore, when the turbine engine is running in steady operation, the reduction in the demand for flow towards the jack caused by the closing of the distributor is provided by a reduction in the rotation speed of the pump and the compressed-air motor; the pump then sends into the control distributor a flow of hydraulic liquid or fuel which is relatively low but nonetheless sufficient to compensate for the loss of any escaping fluid and to supply a cooling circuit in said pump, while in the previous systems the pump does not stop turning at high speed, even in steady operation, which gives rise to undesirable overheating. Thus, utilization according to the present invention of a constant-capacity positive displacement pump driven at a variable speed according to the demand for flow to the jacks yields essentially the same advantages as a variable-output self regulating pump but at a constant, rotation speed, with the additional advantage that, in the case of the system according to the present invention, the constant-capacity pump turns most of the time, i.e., in steady operation, at a low speed which considerably slows down its wear. Furthermore, the increased weight due to the compressed-air motor included in the system according to the present invention is at least partially compensated for by the elimination of the drive from the shaft of the turbine engine for the mechanical drive of the pump.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

The Sole FIGURE is a schematic representation of the preferred system of the invention.

DETAILED DESCRIPTION OF THE PREFERRED EMBODIMENT

Figure 1:
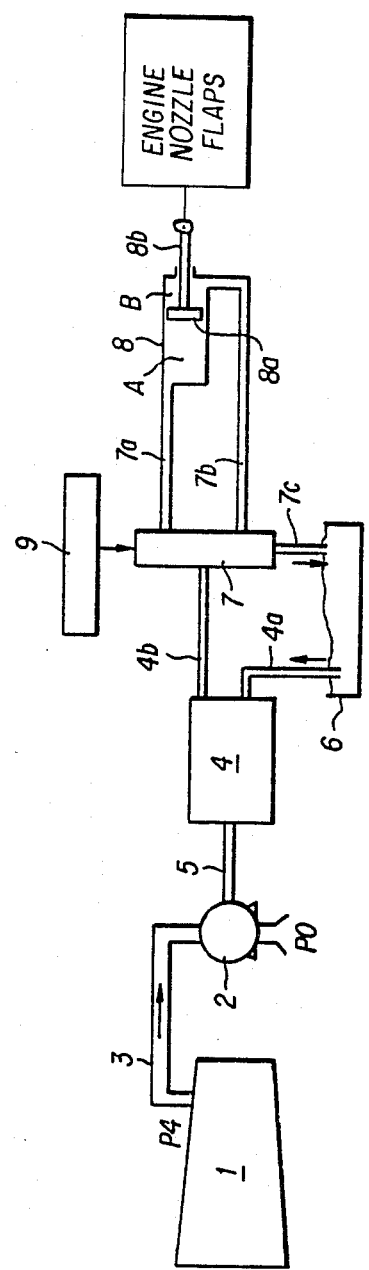

In the FIGURE, only the compressor 1 of a turbine engine, in particular a turbojet, has been shown. A rotary compressed-air motor 2 is supplied by a duct 3 with high-pressure air bled, for example, from the outlet of the last stage of the compressor 1 at a pressure P4 which is variable according to the operating speed of the turbojet. The air expanded through the compressed-air engine 2 escapes into the atmosphere at a pressure Po. A rotary, constant-capacity displacement pump 4 includes a rotor which is permanently coupled to that of the compressed-air engine 2 by known means, which have been illustrated in the form of a shaft 5. The suction-pipe 4a of the pump 4 is immersed in hydraulic liquid within reservoir 6, while its delivery-pipe 4b ends at the inlet of a distributor 7, the outlets of which are themselves connected by ducts 7a and 7b to the two chambers A and E of a hydraulic jack 8. The rod 8b of the piston 8a of the hydraulic jack 8 is coupled by means which have not been shown to one or more of the movable flaps with which the nozzle of the turbine engine in question is equipped in a known manner. The distributor 7, which is known to those skilled in the art and is not described in detail, is designed so as to connect its inlet, that is, its pipe connected to the duct 4b, either to the duct 7a or to the duct 7b, according to signals of any physical nature, for example pneumatic, hydraulic, electrical, etc., coming from a calculating and control system 9. At the same time that it directs the flow of hydraulic liquid sent by the pump 4 towards either the chamber A or the chamber B of the jack 8, the distributor 7 has the other chamber, B or A, communicating with a return duct 7c, which discharges above or into the reservoir 6. Instead of containing a special hydraulic liquid, the reservoir 6 may contain fuel. The calculating and control system 9 includes known means for producing the signals to control the distributor 7 from data relating to the instantaneous operating conditions of the turbine engine, which suitable sensors transmit to the control system inlets. This calculating and control system may also be integrated into the general calculator controlling the operation of the turbine engine.

If we designate the constant capacity of the compressed-air engine 2 by $am$ and the capacity of the constant displacement pump 4 by $ap$, and assuming that the overall efficiency of this rotary pump group is slightly lower than one, we can easily see that the relative delivery pressure of said pump 4 is given by the formula:

$$\Delta p = (am/ap)^{(P_4 - P_o)}$$

i.e., that the maximum pressure applicable to the piston 8a of the hydraulic jack 8 is essentially proportional to the relative pressure of the air across the compressed-air engine 2. As has already been indicated, this results in an automatic adaptation between the control force applied to the movable flap by the rod 8a of the jack 8, on the one hand, and, on the other hand, the resistance to the displacement of said flap, resulting from the pressure exerted on it by the hot gases passing through the nozzle.

Naturally, the compressed-air engine 2 could be fed with air bled at a lower pressure from one of the prior stages of the compressor 1 of the turbojet.

The system according to the present invention may be utilized to control all types of nozzle flaps in a turbine engine.

Of course, the sole jack 8 can simultaneously control several movable valves of the nozzle, these valves being coupled together mechanically in a known manner.

Several jacks, each intended to control a single flap, may also be fed in parallel through the outlet ducts 7a and 7b of the distributor 7.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for controlling exhaust flaps of a turbine engine nozzle, said engine having a compressor compressing air to a variable pressure, said system comprising:

constant capacity, positive displacement compressed air motor means having an output and having input means communicating only with high pressure air from said compressor for driving said compressed air motor means at a variable speed;

constant capacity, positive displacement pump means having an output and being driven by said output of said compressed air motor means, a pressure of said pump output being proportional to said compressed air motor means input;

a distributor having outlet means and having an inlet connected to said output of said pump means; and hydraulic jack means fed by said outlet means of said distributor, said hydraulic jack means including means for actuating said exhaust flaps of said turbine engine nozzle;

whereby a pressure of said output of said pump is proportional to a pressure of said high pressure air, wherein the delivery of the positive displacement pump means is always proportional to the delivery of air going through the constant capacity, positive displacement compressed air motor means, whereby when said exhaust flaps do not require delivery from said pump, said pump means stops at the same time as said motor means, thus cancelling delivery of said high pressure air, so that the pressure at said outlet means of said pump means is then proportional to the air pressure at the intake of the compressed air motor means, whereby the energy expended to control said flaps is always exactly suited to the needs thereof under all operating conditions.

2. The system of claim 1 wherein said pump means is adapted to pump one from a group consisting of turbo-jet engine fuel and conventional hydraulic fluid.

3. The system of claim 1 or 2 wherein said compressor is a multistage compressor and said input means of said compressed air motor means communicates with the outlet of the final stage of said compressor.

* * * * *